United States Patent
Mao et al.

(10) Patent No.: US 10,601,850 B2
(45) Date of Patent: Mar. 24, 2020

(54) IDENTIFYING RISKY USER BEHAVIORS IN COMPUTER NETWORKS

(71) Applicant: Alibaba Group Holding Limited, George Town (KY)

(72) Inventors: Renxin Mao, Hangzhou (CN); Chao Sun, Hangzhou (CN); Xinkai Li, Hangzhou (CN); Dijun He, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 205 days.

(21) Appl. No.: 15/694,030

(22) Filed: Sep. 1, 2017

(65) Prior Publication Data
US 2018/0013780 A1 Jan. 11, 2018

Related U.S. Application Data

(63) Continuation of application No. PCT/CN2016/074424, filed on Feb. 24, 2016.

(30) Foreign Application Priority Data

Mar. 2, 2015 (CN) .......................... 2015 1 0093725

(51) Int. Cl.
*H04L 29/06* (2006.01)
*H04W 12/12* (2009.01)
(Continued)

(52) U.S. Cl.
CPC ........ *H04L 63/1425* (2013.01); *G06F 21/552* (2013.01); *G06F 21/577* (2013.01); *H04L 63/1433* (2013.01); *H04W 12/12* (2013.01)

(58) Field of Classification Search
CPC . H04L 63/1425; H04L 63/1433; H04L 29/06; G06F 21/577; G06F 21/552; H04W 12/12
(Continued)

(56) References Cited

U.S. PATENT DOCUMENTS 7,574,382 B1 8/2009 Hubert
7,574,832 B1 8/2009 Lieberman
(Continued)

FOREIGN PATENT DOCUMENTS

CN 103297267 A 9/2013
CN 104011731 A 8/2014
(Continued)

OTHER PUBLICATIONS

International Search Report and Written Opinion of the International Searching Authority issued in International Application No. PCT/CN2016/074424 dated May 26, 2016; 8 pages.
(Continued)

*Primary Examiner* — Alexander Lagor
*Assistant Examiner* — Quazi Farooqui
(74) *Attorney, Agent, or Firm* — Fish & Richardson P.C.

(57) ABSTRACT

A method of identifying risky user behaviors in computer networks includes determining behavior data of a user. The behavior data describes user activities of the user using a computer network. A particular event chain is identified from the behavior data. The particular event chain includes one or more events of the user activities. A risk coefficient of the particular event chain is determined. Based on the risk coefficient, whether the particular event chain represents a risky user behavior is determined.

17 Claims, 6 Drawing Sheets

(51) Int. Cl.
*G06F 21/55* (2013.01)
*G06F 21/57* (2013.01)

(58) Field of Classification Search
USPC ......... 723/26; 726/26, 23, 22; 713/165–167, 713/178
See application file for complete search history.

(56) References Cited

U.S. PATENT DOCUMENTS

| | | | |
|---|---|---|---|
| 10,075,474 B2* | 9/2018 | Boice | H04L 63/20 |
| 2007/0245420 A1 | 10/2007 | Yong et al. | |
| 2010/0299292 A1 | 11/2010 | Collazo | |
| 2011/0321175 A1 | 12/2011 | Slater | |
| 2013/0097709 A1 | 4/2013 | Basavapatna et al. | |
| 2013/0117397 A1 | 5/2013 | Chasin et al. | |
| 2014/0201806 A1 | 7/2014 | Kumar | |
| 2014/0359777 A1 | 12/2014 | Lam et al. | |
| 2015/0039513 A1* | 2/2015 | Adjaoute | G06Q 20/4016 705/44 |

FOREIGN PATENT DOCUMENTS

| | | |
|---|---|---|
| CN | 104376266 A | 2/2015 |
| JP | 2010108469 | 5/2010 |
| WO | WO 2013059348 A1 | 4/2013 |
| WO | 2014088559 A1 | 6/2014 |

OTHER PUBLICATIONS

Search Report and Written Opinion of the Intellectual Property Office of Singapore issued in Singapore Application No. 11201707032U dated Jun. 18, 2018; 9 pages.

Extended European Search Report in European Application No. 16758446.5, dated Oct. 4, 2018, 7 pages.

Mashima et al., "Using Identity Credential Usage Logs to Detect Anomalous Service Accesses," Proceedings of the 5th ACM workshop on Digital Identity Management, Nov. 2009, pp. 73-79.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

IDENTIFYING RISKY USER BEHAVIORS IN COMPUTER NETWORKS

CROSS REFERENCE TO RELATED APPLICATIONS

This application is a continuation of PCT Application No. PCT/CN2016/074424, filed on Feb. 24, 2016, which claims priority to Chinese Application No. 201510093725.4, filed on Mar. 2, 2015, the entire contents of each which are hereby incorporated by reference.

BACKGROUND

With the ongoing development in and use of Internet technologies, users can use the Internet to perform various activities or operations, such as visiting webpages, downloading/uploading files, and sending/receiving emails. In some instances, whether deliberately or inadvertently, user may involve themselves in inappropriate or risky behaviors using computer networks. For example, an employee may visit webpages irrelevant to their work during normal work hours, or a bank employer or a customer service representative may violate policies prohibiting non-work-related access to a customer's private information. These inappropriate user behaviors can result in negative impacts (for example, legal, civil, or criminal penalties) to organizations, entities, or individuals. Mechanisms can be designed to monitor a computer network and to identify inappropriate or risky user behaviors.

SUMMARY

The present disclosure describes identifying risky user behaviors in computer networks.

In an implementation, behavior data of a user is determined. The behavior data describes user activities of the user using a computer network. A particular event chain is identified from the behavior data. The particular event chain includes one or more events of the user activities. A risk coefficient of the particular event chain is determined. Based on the risk coefficient, whether the particular event chain represents a risky user behavior is determined.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the described approach can efficiently identify risky user behaviors without defining rules for risky behaviors, therefore reducing efforts to develop and update rules, and saving computer resources to store rules and to execute rules. Second, the described approach can reliably identify risky user behaviors by taking various factors into and considering the various factors for a risk evaluation. For example, the risk can be evaluated by considering a user's short-term and long-term behaviors, as well as other users' behaviors who are in a same group as the user. Third, the described approach can provide a warning to users to not perform the identified risky user behaviors. Reducing network behaviors can improve network security, reduce network traffic, and enhance network efficiency by increasing availability of network resources and reducing network traffic related to the identified risky user behaviors. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes identifying risky user behaviors in computer networks, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Existing approaches for identifying risky user network behaviors usually involve defining rules for risky behaviors, for example, specifying individual webpages that are relevant or irrelevant to an employee's duties. Risky behaviors can be then identified by analyzing user behaviors against the defined rules. However, in some instances, defining a complete set of rules can be prohibitively time-consuming and impossible to achieve. In some instances, the rules may need to be constantly developed and updated, which can consume a large amount of resources and proactive activity.

Additionally, a significant amount of computer resources may be needed for storing the rules and extra computer processing power for comparing user behaviors against the rules.

At a high-level, the described approach provides a mechanism to efficiently and reliably identify risky user behaviors. A user's network activities or behaviors are recorded, for example, webpage addresses the user has visited or information the user entered on a webpage. Based on the recorded behavior data, a particular event chain (that is, a series of activities or events of a user using a computer network) is identified. For determining whether the particular event chain is a risky behavior, one or more risk coefficients are calculated. The risk coefficients can be used to represent a rarity of the user or a group of users associated with that user performing the particular event chain. For example, the event chain can be considered risky if the user or the group of users would be considered to seldom perform the particular event chain. An overall risk coefficient is calculated by considering the user's short-term and long-term behaviors, as well as the group of users' behavior. For example, the overall risk coefficient can be based on a short-term risk coefficient, a long-term risk coefficient, and a group risk coefficient. The short-term risk coefficient indicates the rarity of the user performing the event chain during a short period of time, for example, within one day. The long-term risk coefficient indicates rarity of the user performing the event chain during a long period of time, for example, since the user has registered a computer account. The group risk coefficient indicates the rarity of the group of users associated with that user performing that event chain. Based on the overall risk coefficient, a determination is made whether the particular event chain is a risky behavior.

Figure 1:
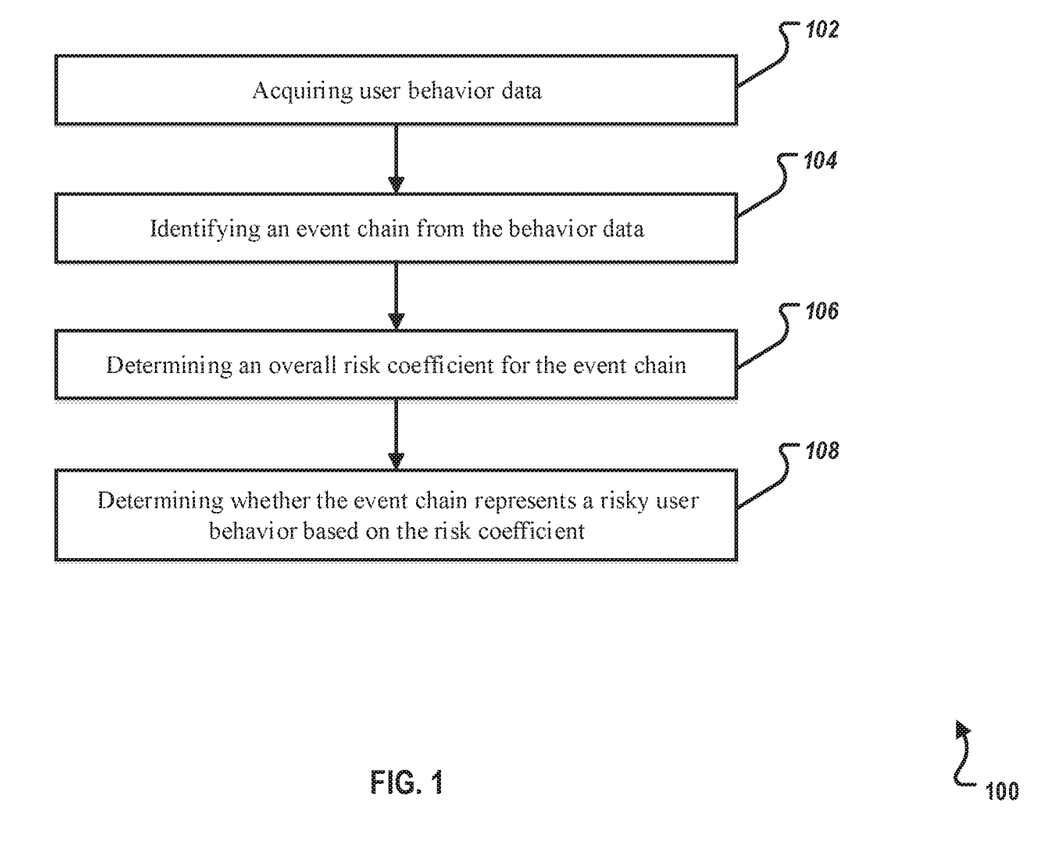
FIG. 1 is a flowchart illustrating an example method for identifying a risky user behavior, according to an implementation of the present disclosure.

FIG. 1 is a flowchart illustrating an example method 100 for identifying a risky user behavior, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

At 102, a user's network behavior data is acquired. As previously described, the user can perform various activities or operations using a computer network, for example, visiting Internet webpages, downloading/uploading files, or sending/receiving emails. A typical computer network includes multiple computers (including a local computer the user is using to access the computer network), computing devices, servers, routers, gateways, wired or wireless connection links, and other components consistent with this disclosure. A user's network behaviors can include activities and operations the user performed on the computer network, for example, sending or receiving information to or from the computer network and operations performed on the local computer. In some implementations, other data associated with the user can also be acquired, such as human resource records or other data consistent with this disclosure. The computer network can be a local area network, a metropolitan area network, a wide area network, or other type of computer network consistent with this disclosure.

In some cases, the user behavior data can be acquired through a network monitoring system used to monitor or control computers in the computer network. For example, the monitoring system can acquire and record the user's network activities as well as time, an identity of the user, or other information associated with the user's network activities. In some cases, for each acquired or recorded network activity, the behavior data can include an identity of the user who performed the network activity, and time information when the network activity was performed. The network monitoring system can include monitoring hardware, software, or both. For example, the monitoring software or hardware can be installed on an individual computer in the computer network, a central server connected to the computers in the computer network, or a combination of both, and record network activity or other data with respect to the computer network.

The acquired user behavior data can include data sent to or received from the computer network, webpage addresses (such as uniform resource locators) the user visited, information the user entered on a webpage, information the user downloaded from a webpage, screen shots, time information associated with each activity, or other types of information data consistent with this disclosure. For example, a user's behavior data can be: at time T1 visiting webpage W1, at time T2 entering a character string S on the webpage W1, and at time T3 clicking button B on the webpage W1 and directing to webpage W2.

The acquired behavior data can be stored in a storage medium or a database at the individual computer or a central server. In some cases, a central server can access the behavior data stored in each computer. In some cases, the individual computer can send the behavior data to the central server. The behavior data can be stored in various data types or formats, such as formatted text, binary, hexadecimal, encrypted data, or other types or formats.

The monitoring system can acquire behavior data relevant to the risky behaviors to be identified. For example, if a risky behavior to be identified is accessing webpages irrelevant to a user's work, the monitoring system can capture addresses of webpages the user has accessed using the computer network. This behavior data can be processed or analyzed to identify if the risky behavior of accessing irrelevant webpages from the computer network has occurred. From 102, method 100 proceeds to 104.

At 104, an event chain is identified from the acquired behavior data, as will be discussed in FIG. 2. In some implementations, an event chain is an ordered sequence of events or activities indexed according to time. An event chain can provide additional contextual information relevant to a user's intention in performing one or more network activities. For example, when a user accesses a webpage, the user may have been intentional or unintentional. For example, the user may have accidentally selected the webpage address, realized what the web page was, and immediately navigated to a different webpage address. However, if the user accesses the webpage, enters information on the webpage, and navigates between one or more webpage links, it is likely that the user intentionally visited the webpage. Therefore, examining an event chain for context can be more efficient and reliable in identifying risky behaviors than examining a single event.

Figure 2:
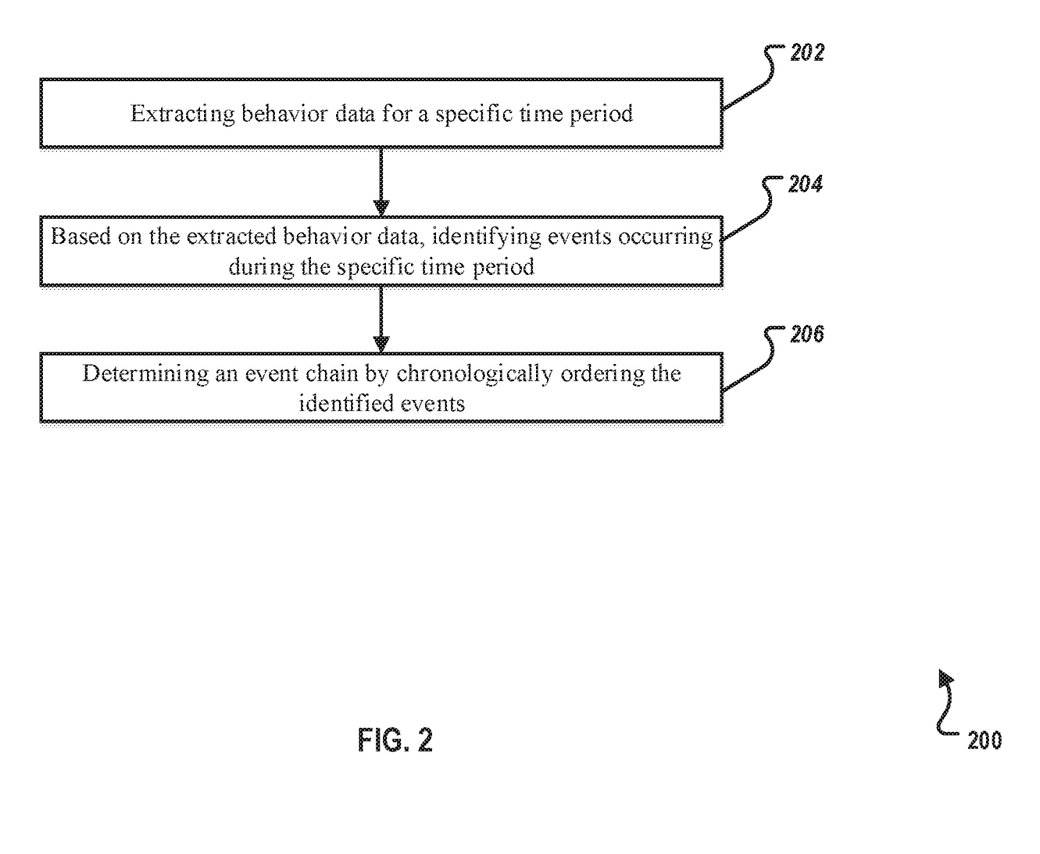
FIG. 2 is a flowchart illustrating an example method for identifying an event chain from user behavior data, according to an implementation of the present disclosure.

Turning to FIG. 2, FIG. 2 is a flowchart illustrating an example method 200 for identifying an event chain from user behavior data, according to an implementation of the present disclosure. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At 202, the user's behavior data is extracted from the available behavior data for a specific time period (for example, a starting time and a duration). For instance, as previously described, the behavior data can include a user's identity and time information for each recorded network activity. Based on the user identity and time information, a particular user's behavior data for a specific time period can be determined and extracted.

In some implementations, the specific time period can be manually or dynamically configured, for example, by a system operator or an algorithmic process. In some implementations, the specific time period is determined based on a time period of a network communication session, such as an HTTP session. When a user performs a series of network activities, these activities can be performed through a network communication session such as an HTTP session. If the user performs no activity for a predetermined period of time, the communication session can be automatically released by the network. The time period of the communication session can be considered as the specific time period. In some implementations, the start time of the specific time period is the start time of the communication session or the time of the first activity in the session, and the end time of the specific time period is the time of the last activity in the session or when the session is released. The time information of the communication session, the activities in the communication session, and the time information of these activities in the communication session can be recorded as the user behavior data. For example, a system operator may determine that a particular user had a communication session during a time period from 13:10 to 13:25 on Jan. 1, 2014, and the system operator wants to determine if this communication session includes any risky behaviors. Here, the specific time period is 15 minutes (13:10 to 13:25) on that particular date (Jan. 1, 2014). The behavior data corresponding to this time period can be extracted from the available behavior data. From 202, method 200 proceeds to 204.

At 204, events during the specific time period are identified based on extracted behavior data. For example, the events can be identified based on the information recorded in the behavior data, such as webpage addresses, information the user entered on a webpage, or actions the user performed on a webpage. From 204, method 200 proceeds to 206.

At 206, an event chain is determined by chronologically ordering the identified events. An event chain includes more than one event. For instance, during the time period from 13:10 to 13:25, the behavior data can show event X (for example, the user visiting webpage W1) at 13:15, event Y (for example, the user entering information on the webpage W1) at 13:20, and event Z (for example, the user clicking a button and accessing webpage W2) at 13:22. Since event X happens first and event Z happens last, the event chain can be structured as event X→event Y→event Z. After 206, method 200 stops.

Returning to FIG. 1, from 104, method 100 proceeds to 106.

At 106, an overall risk coefficient is determined for the event chain identified at 104 and using method 200. A risk coefficient can be a numerical or other value indicating the rarity of the occurrence of a particular event chain. For example, in some implementations, a large risk coefficient value indicates that a particular event chain rarely occurs, indicating a likely risky behavior, while a small risk coefficient value can indicate more normal behavior because the particular event chain occurs on a frequent basis.

Figure 3:
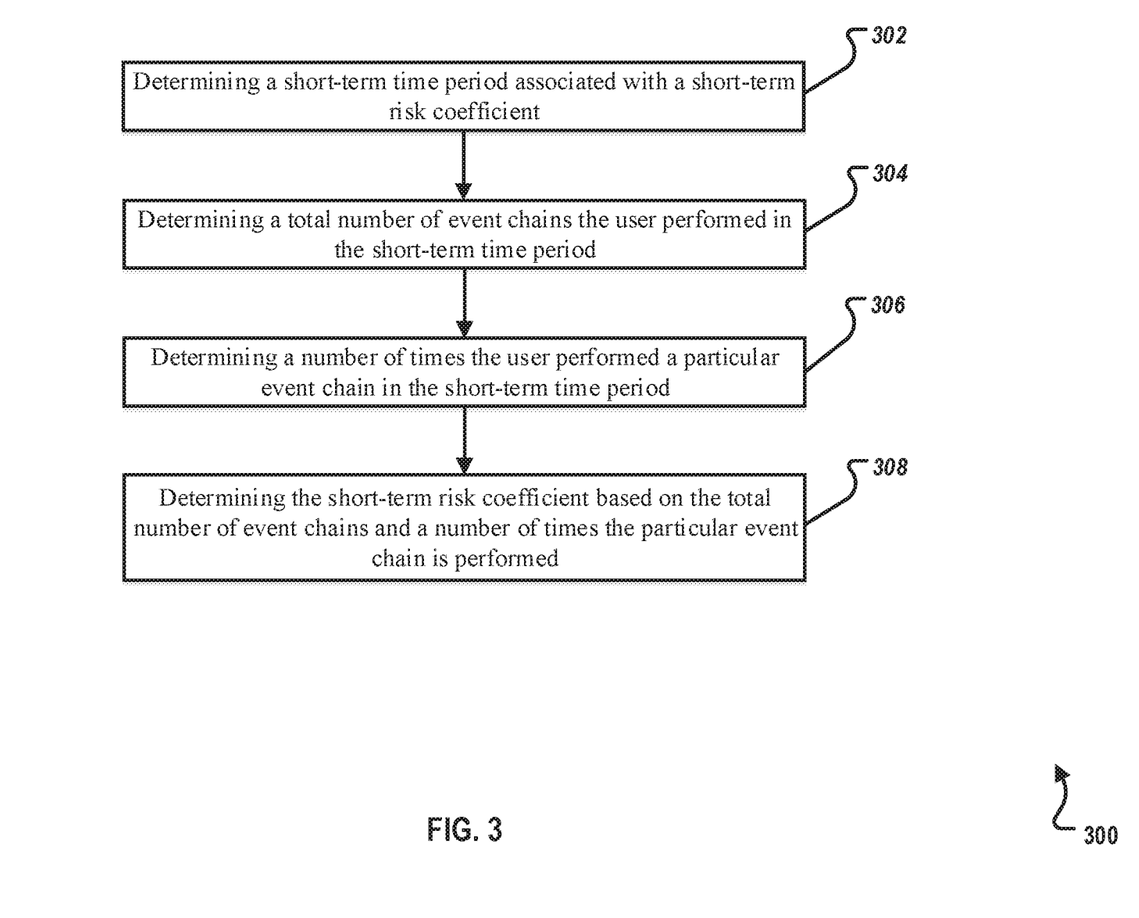
FIG. 3 is a flowchart illustrating an example method for determining a short-term risk coefficient, according to an implementation of the present disclosure.

To assess the rarity of an event chain, an overall risk coefficient can be determined based on various factors, such as a user's short- and long-term behaviors, as well as other users' behaviors who are in the same group as the user. The overall risk coefficient can include, but is not limited to, one or more of a short-term risk coefficient, a long-term risk coefficient, a group risk coefficient, and other risk coefficients or values consistent with this disclosure. The short-term risk coefficient, as will be discussed in FIG. 3, is used to indicate a rarity of the user performing a particular event chain in a short-term time period, for example, within one day. The long-term risk coefficient, as will be discussed in FIG. 4, indicates a rarity of the user performing the particular event chain in a long-term time period, for example, a time period from when the user registered a computer account to a current or other time. If the user belongs to a user group which includes multiple users, the group risk coefficient, as will be discussed in FIG. 5, represents a rarity of the users in the user group performing the particular event chain. The overall risk coefficient can be determined based on, but not necessarily limited to, the short-term risk coefficient, the long-term risk coefficient, and the group risk coefficient. In some implementations, other values consistent with this disclosure can be used in determination of the overall risk coefficient.

For example, for determining a risk coefficient of a particular event chain that was performed by a particular user on a particular day, the short-term risk coefficient can be used to determine the rarity of the user performing that particular event chain on the particular day, the long-term risk coefficient can be used to determine the rarity of the user performing that particular event chain since the user has registered their computer account, and the group risk coefficient can be used to determine the rarity of the group of users performing that particular event chain on the particular day.

Turning to FIG. 3, FIG. 3 is a flowchart illustrating an example method 300 for determining a short-term risk coefficient, according to an implementation of the present disclosure. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At 302, a short-term time period (denoted as t1) associated with the short-term risk coefficient is determined. The short-term time period can be any time period that is predetermined or dynamically configured, for example, by a system operator or an algorithmic process. For example, the short-term time period can be the particular day that the user performed the particular event chain, or other time periods consistent with this disclosure. From 302, method 300 proceeds to 304.

At 304, a total number of event chains (denoted as s1) the user performed in the short-term time period is determined. For example, if the short-term time period is the particular day that the user performed the particular event chain, based on the user's behavior data of that day, the total number of event chains performed by the user on that day can be determined. In some cases, based on the recorded communication sessions, each communication session can represent an event chain, and the total number of event chains the user performed in the short-term time period can be determined. In some cases, a typical time duration of an event chain can be predetermined or dynamically configured by a system operator or an algorithmic process, for example, based on an average, medium, minimum, maximum, or other types of statistical time duration of event chains. The total number of event chains the user can perform in the short-term time period can be determined based on the typical time duration of an event chain. For example, if the short-term time period is one day (24 hours), the typical time duration of an event chain is 15 minutes, the total number of event chains the user can perform in the short-term time period is s1=24*60/15=96. From 304, method 300 proceeds to 306.

At 306, a number of times (denoted as s2) the user performed the particular event chain in the short-term time period is determined. In some cases, based on the user's recorded communication sessions, the number of communication sessions that include the particular event chain during the short-term time period can be determined and assigned to s2. In some cases, the short-term time period can be divided into a number of non-overlapping or overlapping time intervals, and for each time interval a determination is made whether the particular event chain has been performed in that time interval. For example, each time interval can have a length of the typical time duration of an event chain. If the typical time duration of an event chain is considered to be 15 minutes, and the short-term time period is considered to be one day (24 hours), then the 24-hour period can be divided into 24*60/15=96 non-overlapping, 15-minute time intervals. For each 15-minute time interval, a determination is made as to whether the particular event chain was performed in that particular time interval. If yes, s2 is incremented by 1. In other words, s2 indicates the number of time intervals in which the particular event chain was performed. From 306, method 300 proceeds to 308.

At 308, the short-term risk coefficient is determined based on the total number of event chains s1 and the number of times performing the particular event chain s2. For example, the short-term risk coefficient can be a ratio of s1 to s2, that is, s1/s2. Other mathematical formulas consistent with the described subject matter can also be used to calculate the short-term risk coefficient and are considered to be within the scope of this disclosure. After 308, method 300 stops.

Figure 4:
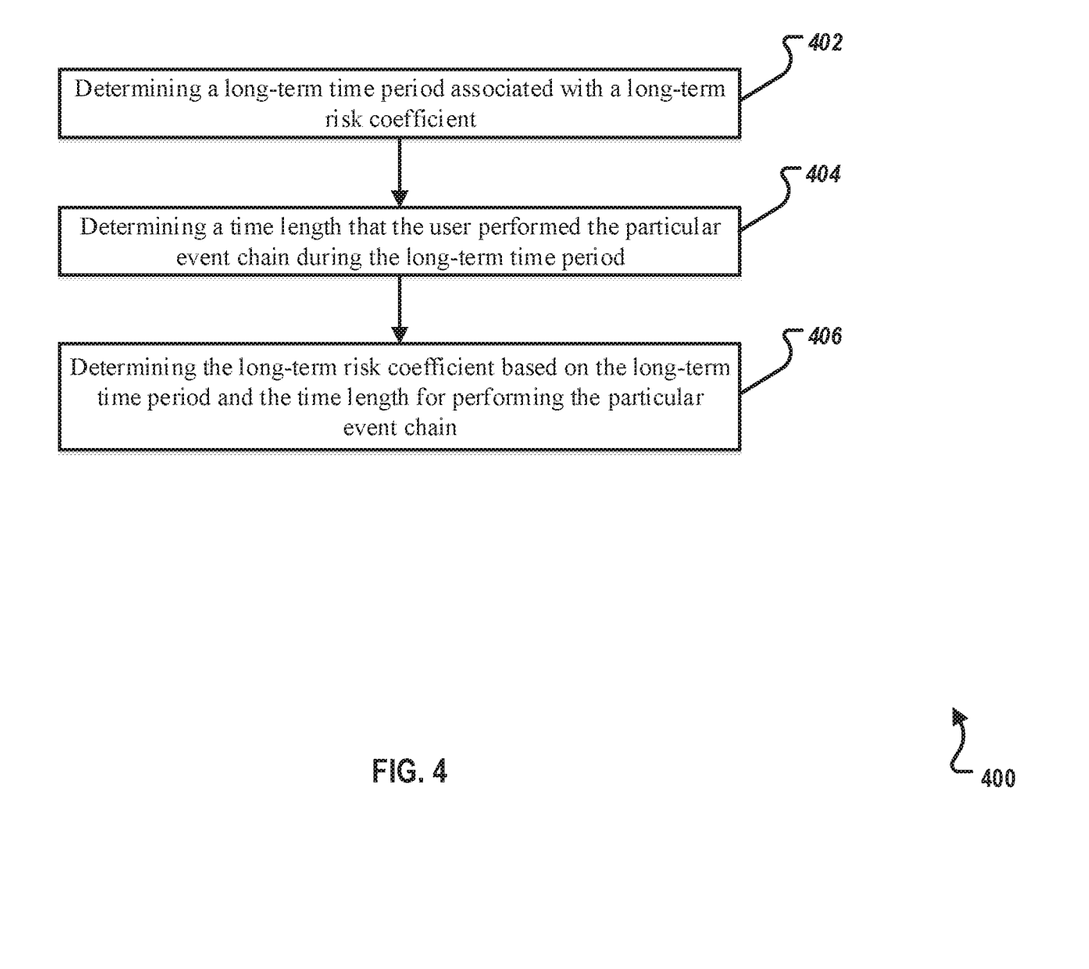
FIG. 4 is a flowchart illustrating an example method for determining a long-term risk coefficient, according to an implementation of the present disclosure.
Figure 5:
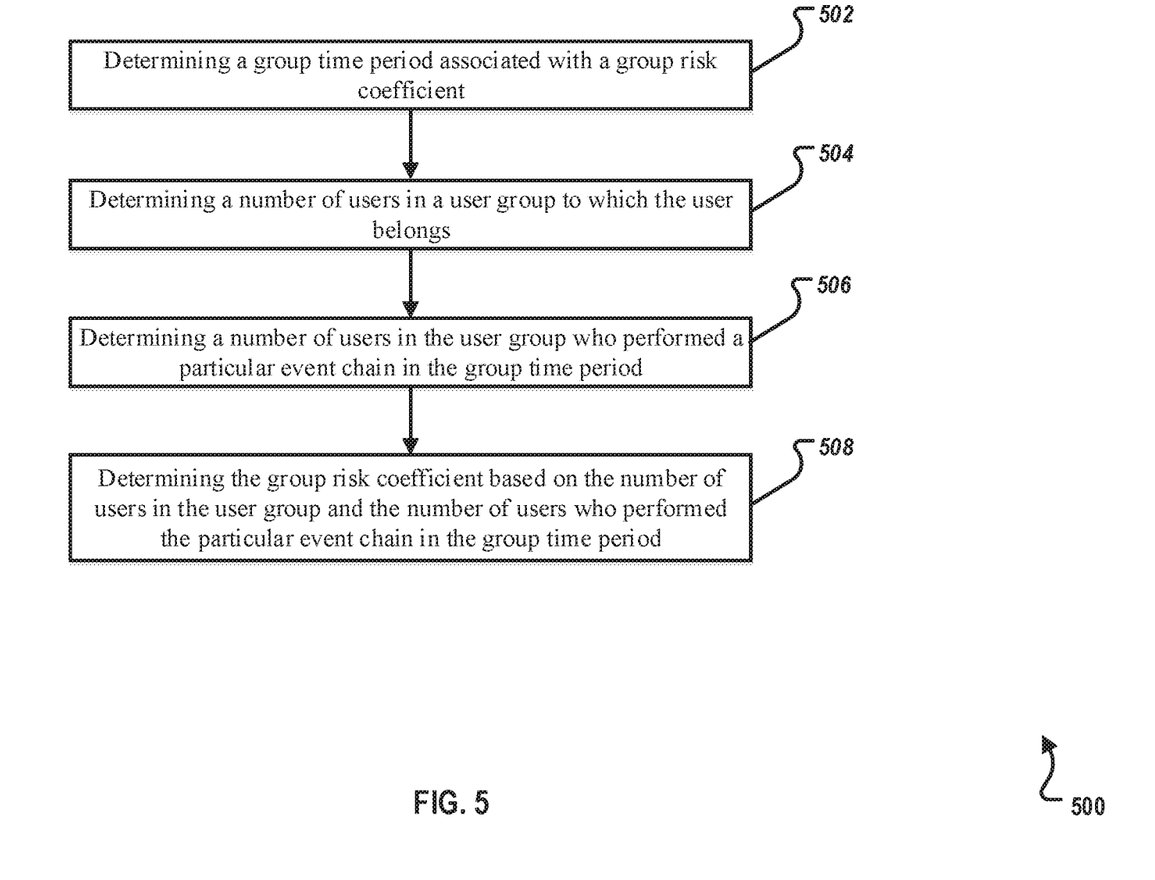
FIG. 5 is a flowchart illustrating an example method for determining a group risk coefficient, according to an implementation of the present disclosure.

Turning to FIG. 4, FIG. 4 is a flowchart illustrating an example method 400 for determining a long-term risk coefficient, according to an implementation of the present disclosure. For clarity of presentation, the description that follows generally describes method 400 in the context of the other figures in this description. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

At 402, a long-term time period (denoted as t2) associated with the long-term risk coefficient is determined. The long-term time period can be any length of time greater than the short-term time period associated with the short-term risk coefficient. The long-term time period can be predetermined or dynamically configured by a system operator or an algorithmic process. For example, the long-term time period can be considered to be from the time the user registered a computer account to a current or other time. If the user registered a user account on Jan. 1, 2014, and a current time is Jan. 1, 2015, then the long-term time period t2 can be considered to be 365 days. From 402, method 400 proceeds to 404.

At 404, a time length (denoted as t3) that the user performed a particular event chain during the long-term time period is determined. For example, the long-term time period can be divided into non-overlapping or overlapping time intervals. For each time interval, a determination can be made whether the particular event chain has been performed in that time interval. For example, each time interval can be considered to have a length of one day (24 hours), and the long-term time period of 365 days can be divided into 365, non-overlapping time intervals. For each day, a determination is made whether the particular event chain was performed in that day. If yes, the time length t3 is increased by one day. In other words, the time length t3 indicates the number of days in which the particular event chain was performed. In other words, the particular event chain can span all or part of multiple days. From 404, method 400 proceeds to 406.

At 406, the long-term risk coefficient is determined based on the long-term time period t2 and the time length t3 for performing the particular event chain. For example, in some implementations, the long-term risk coefficient can be a ratio of t2 to t3, that is, t2/t3. Other mathematical formulas consistent with the described subject matter can also be used to calculate the long-term risk coefficient and are considered to be within the scope of this disclosure.

In some implementations, for achieving balance with respect to users having different long-term time periods, additional processing can be applied to the determination of the long-term risk coefficient. For example, a new user who has recently registered a computer account can have a small value for the long-term time period, say, 5 days, while an experienced user who registered the computer account years in the past can have a large value for the long-term time period, say, 5 years. If both users performed the particular event chain for two days (t3=2), the new user could have a long-term risk coefficient calculated to be 5/2=2.5, while the experienced user could have a much higher long-term risk coefficient calculated to be (5*365)/2=912.5. To be fair to the experienced user, the long-term time period t2 and the time length t3 can be pre-processed to normalize calculated values so as to not artificially skew results for one or more users. For example, the pre-processing can be logarithmic processing, modulo processing, root extraction processing, or other processing consistent with this disclosure. For instance, t2 and t3 can be pre-processed by a logarithmic function, and the long-term risk coefficient calculated as (1+lg(t2))/(1+lg(t3)). In the previous example, after applying the logarithmic function, a difference between 5 days and 5 years is significantly reduced because 5 days becomes lg(5)=0.7 while 5 years becomes lg(5*365)=3.3. After 406, method 400 stops.

FIG. 5 is a flowchart illustrating an example method 500 for determining a group risk coefficient, according to an implementation of the present disclosure. For clarity of presentation, the description that follows generally describes method 500 in the context of the other figures in this description. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order.

At 502, a group time period (denoted as t4) associated with the group risk coefficient is determined. The group time period can be any time period that is predetermined or dynamically configured by a system operator or an algorithmic process. In some implementations, the group time period can be a particular day that the user performed a particular event chain, or other time periods consistent with this disclosure. From 502, method 500 proceeds to 504.

At 504, a number of users in a user group to which the user belongs (denoted as n) is determined. For example, if the user is a customer service representative, the user group can be all or a subset of users in a customer service department. From 504, method 500 proceeds to 506.

At 506, a number of users in the user group who performed a particular event chain in the group time period (denoted as m) is determined. For example, if a particular user performed the particular event chain on a particular day and the group time period is that particular day, the number of users in the user group who performed the event chain on that day can be incremented by one. As behavior data is associated with a particular user's identity, behavior data can be extracted for each user in the user group. Based on the behavior data of the users in the user group, for each particular user, a determination is made whether the particular user has performed the particular event chain on that particular day. From 506, method 500 proceeds to 508.

At 508, the group risk coefficient is determined based on the number of users in the user group and the number of users who performed the particular event chain in the group time period. For example, the group risk coefficient is determined by dividing the number of users in the user group by the number of users who performed the particular event chain in the group time period, that is, n/m.

In some implementations, to achieve balance with respect to user groups having different number of users, additional processing can be applied to the determination of the group risk coefficient. For example, a large user group can have one-thousand users (n=1000), while a small user group may have only 10 users (n=10). If both groups have 5 users that performed the particular event chain (m=5), the smaller user group could have a group risk coefficient calculated to be 10/5=2, while the large user group could have a much higher group risk coefficient calculated to be 1000/5=200. To be fair to the large user group, the numbers of users n and m can be pre-processed to normalize calculated values so as to not artificially skew results for one or more user groups. For example, the pre-processing can be logarithmic processing, modulo processing, root extraction processing, or other processing consistent with this disclosure. For instance, n and m can be pre-processed by a logarithmic function, and the group risk coefficient can be calculated as (1+lg(n))/(1+lg(m)). In the previous example, after applying the logarithmic function, a difference between 10 users and 1000 users is significantly reduced to a difference between lg(10)=1 and lg(1000)=3. After 508, method 500 stops.

Returning to FIG. 1, at 106, the overall risk coefficient (denoted as r) can be calculated based on the short-term risk coefficient (denoted as a), the long-term risk coefficient (denoted as b), and the group risk coefficient (denoted as c). For example, in some implementations, the overall risk coefficient can be determined by multiplying or adding the three determined risk coefficients. For instance:

$$r=w1*a*w2*b*w3*c \text{ or } r=w1*a+w2*b+w3*c,$$

where w1, w2, and w3 can be weighting factors for individual risk coefficients. The weighting factors w1, w2, and w3 can be any numbers, for example, w1=w2=w3=1. The overall risk coefficient can also be calculated based on other mathematical functions consistent with this disclosure, for instance:

$$r=f(a,b,c),$$

where f( ) denotes any mathematical function consistent with this disclosure. From 106, method 100 proceeds to 108.

At 108, based on the determined overall risk coefficient for the particular event chain, a determination is made as to whether the particular event chain is a risky behavior. For example, the particular event chain can be considered to be risky if the overall risk coefficient is higher than a particular threshold. The threshold can be manually or dynamically configured by a system operator or an algorithmic process. For example, the threshold can be pre-set or statistically determined based on information in the system.

In some implementation, the particular event chain is considered to be risky if the particular event chain has a higher risk coefficient than other event chains the user has performed. For example, all event chains the user has performed on a particular day can be determined by analyzing the behavior data for that user. For example, based on the recorded communication sessions, all event chains the user has performed on a particular day can be determined. For each identified event chain, the overall risk coefficient is determined based on the short-term risk coefficient, the long-term risk coefficient, and the group risk coefficient, as discussed in FIGS. 3-5. In some implementations, the overall risk coefficients for all the event chains can be ordered, for example, in a descending order. The event chains corresponding to the top N risk coefficients can be considered to be risky, where parameter N can be predetermined or dynamically configured by a system operator or an algorithmic process. For instance, consider that 100 event chains are identified for the user on a particular day, and the corresponding 100 overall risk coefficients are sorted in a descending order. If N=3, then the top three event chains are identified as risky behaviors, and the user can be warned not to perform these behaviors. For example, the system can display a warning message on the user's graphic user interface or send an email to the user. After 108, method 100 stops.

Figure 6:
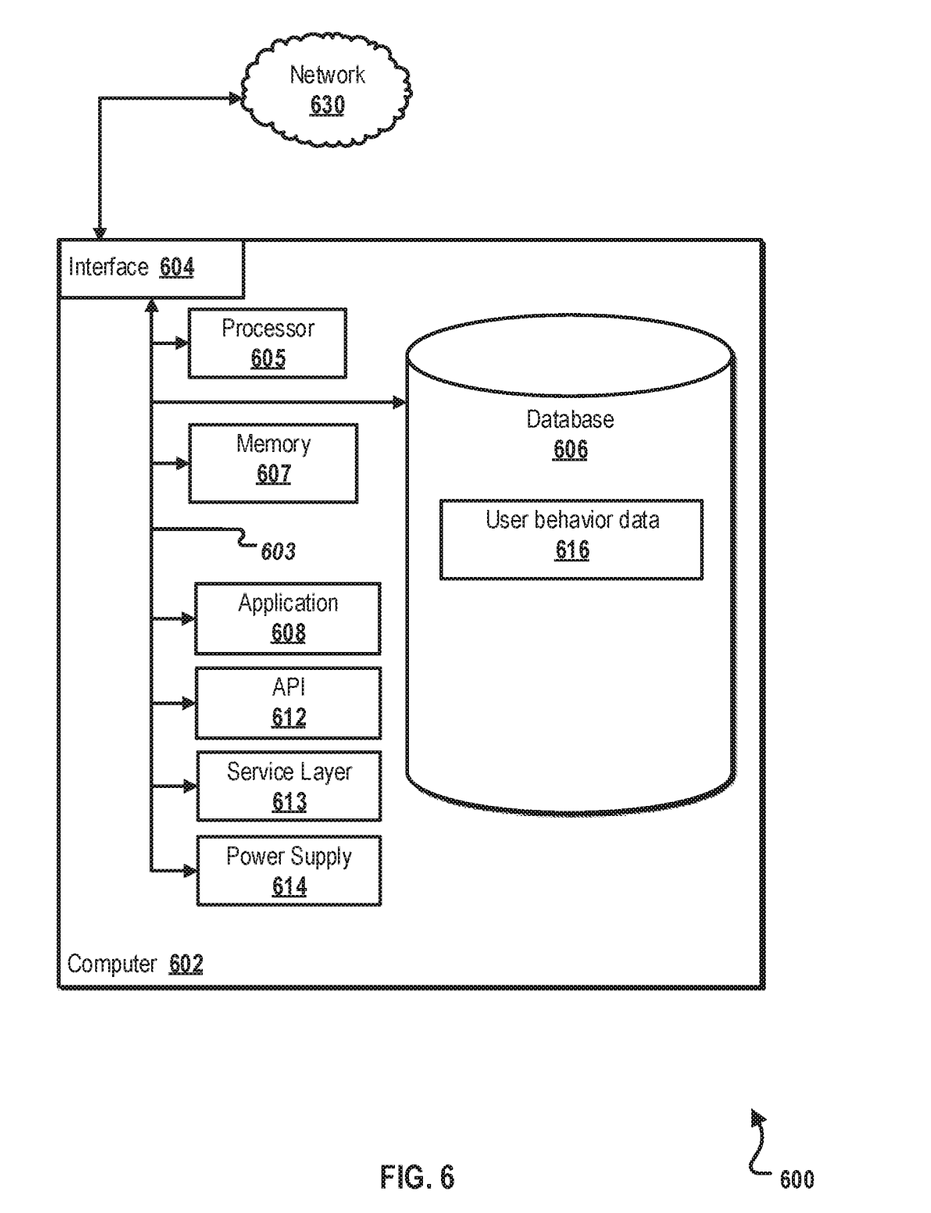
FIG. 6 is a block diagram of an example computer system used to provide computational functionalities associated with described algorithms, methods, functions, processes, flows, and procedures, according to an implementation of the present disclosure.

FIG. 6 is a block diagram of an example computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

At a high level, the computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users (for example, from a command console or by another internal access method), external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds previously described user behavior data 616.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Described implementations of the subject matter can include one or more features, alone or in combination.

For example, in a first implementation, a computer-implemented method, comprising: determining behavior data of a user, wherein the behavior data describes user activities of the user using a computer network; identifying a particular event chain from the behavior data, wherein the particular event chain includes one or more events of the user activities; determining a risk coefficient of the particular event chain; and based on the risk coefficient, determining whether the particular event chain represents a risky user behavior.

The foregoing and other described implementations can each, optionally, include one or more of the following features:

A first feature, combinable with any of the following features, wherein identifying the particular event chain from the behavior data comprises: identifying a time period; based on behavior data corresponding to the time period, determining events occurred during the time period; and determining the particular event chain by sorting the determined events in a chronological order.

A second feature, combinable with any of the previous or following features, wherein the risk coefficient comprises one or more of a short-term risk coefficient, a long-term risk coefficient, or a group risk coefficient.

A third feature, combinable with any of the previous or following features, wherein determining the short-term risk coefficient comprises: determining a short-term time period associated with the short-term risk coefficient; determining a total number of event chains the user performed in the short-term time period; determining a number of times the user performed the particular event chain in the short-term time period; and determining the short-term risk coefficient based on the total number of event chains and the number of times the user performed the particular event chain.

A fourth feature, combinable with any of the previous or following features, wherein determining the long-term risk coefficient comprises: determining a long-term time period associated with the long-term risk coefficient; determining a time length that the user performed the particular event chain during the long-term time period; and determining the long-term risk coefficient based on the long-term time period and the time length for performing the particular event chain.

A fifth feature, combinable with any of the previous or following features, wherein determining the group risk coefficient comprises: determining a total number of users in a user group associated with the user; determining a group time period associated with the group risk coefficient; determining a number of users in the user group that performed the particular event chain in the group time period; and determining the group risk coefficient based on the total number of users in the user group and the number of users that performed the particular event chain.

A sixth feature, combinable with any of the previous or following features, wherein determining whether the particular event chain represents a risky user behavior comprises determining whether the risk coefficient is higher than a threshold.

In a second implementation, a non-transitory, computer-readable medium storing one or more instructions executable by a computer system to perform operations comprising: determining behavior data of a user, wherein the behavior data describes user activities of the user using a computer network; identifying a particular event chain from the behavior data, wherein the particular event chain includes one or more events of the user activities; determining a risk coefficient of the particular event chain; and based on the risk coefficient, determining whether the particular event chain represents a risky user behavior.

The foregoing and other described implementations can each, optionally, include one or more of the following features:

A first feature, combinable with any of the following features, wherein identifying the particular event chain from the behavior data comprises: identifying a time period; based on behavior data corresponding to the time period, determining events occurred during the time period; and determining the particular event chain by sorting the determined events in a chronological order.

A second feature, combinable with any of the previous or following features, wherein the risk coefficient comprises one or more of a short-term risk coefficient, a long-term risk coefficient, or a group risk coefficient.

A third feature, combinable with any of the previous or following features, wherein determining the short-term risk coefficient comprises: determining a short-term time period associated with the short-term risk coefficient; determining a total number of event chains the user performed in the short-term time period; determining a number of times the user performed the particular event chain in the short-term time period; and determining the short-term risk coefficient based on the total number of event chains and the number of times the user performed the particular event chain.

A fourth feature, combinable with any of the previous or following features, wherein determining the long-term risk coefficient comprises: determining a long-term time period associated with the long-term risk coefficient; determining a time length that the user performed the particular event chain during the long-term time period; and determining the long-term risk coefficient based on the long-term time period and the time length for performing the particular event chain.

A fifth feature, combinable with any of the previous or following features, wherein determining the group risk coefficient comprises: determining a total number of users in a user group associated with the user; determining a group time period associated with the group risk coefficient; determining a number of users in the user group that performed the particular event chain in the group time period; and determining the group risk coefficient based on the total number of users in the user group and the number of users that performed the particular event chain.

A sixth feature, combinable with any of the previous or following features, wherein determining whether the particular event chain represents a risky user behavior comprises determining whether the risk coefficient is higher than a threshold.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: determining behavior data of a user, wherein the behavior data describes user activities of the user using a computer network; identifying a particular event chain from the behavior data, wherein the particular event chain includes one or more events of the user activities; determining a risk coefficient of the particular event chain; and based on the risk coefficient, determining whether the particular event chain represents a risky user behavior.

The foregoing and other described implementations can each, optionally, include one or more of the following features:

A first feature, combinable with any of the following features, wherein identifying the particular event chain from the behavior data comprises: identifying a time period; based on behavior data corresponding to the time period, determining events occurred during the time period; and determining the particular event chain by sorting the determined events in a chronological order.

A second feature, combinable with any of the previous or following features, wherein the risk coefficient comprises one or more of a short-term risk coefficient, a long-term risk coefficient, or a group risk coefficient.

A third feature, combinable with any of the previous or following features, wherein determining the short-term risk coefficient comprises: determining a short-term time period associated with the short-term risk coefficient; determining a total number of event chains the user performed in the short-term time period; determining a number of times the user performed the particular event chain in the short-term time period; and determining the short-term risk coefficient based on the total number of event chains and the number of times the user performed the particular event chain.

A fourth feature, combinable with any of the previous or following features, wherein determining the long-term risk coefficient comprises: determining a long-term time period associated with the long-term risk coefficient; determining a time length that the user performed the particular event chain during the long-term time period; and determining the long-term risk coefficient based on the long-term time period and the time length for performing the particular event chain.

A fifth feature, combinable with any of the previous or following features, wherein determining the group risk coefficient comprises: determining a total number of users in a user group associated with the user; determining a group time period associated with the group risk coefficient; determining a number of users in the user group that performed the particular event chain in the group time period; and determining the group risk coefficient based on the total number of users in the user group and the number of users that performed the particular event chain.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or another unit for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual modules that implement described features and functionality using various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
determining behavior data of a user, wherein the behavior data describes user activities of the user using a computer network;
identifying a particular event chain from the behavior data, wherein the particular event chain includes one or more events of the user activities;
determining an overall risk coefficient of the particular event chain, comprising:
determining a short-term risk coefficient, a long-term risk coefficient, and a group risk coefficient;
calculating the overall risk coefficient as an output of a mathematical function which takes the short-term risk coefficient, the long-term risk coefficient, and the group risk coefficient as inputs, wherein the mathematical function is:

$r=w_1*a*w_2*b*w_3*c$ or $r=w_1*a+w_2*b+w_3*c$, wherein r is the overall coefficient, a is the short-term risk coefficient, b is the long-term risk coefficient, c is the group risk coefficient, and wherein $w_1$, $w_2$ and $w_3$ can be weighting factors for individual risk coefficients; and
based on the overall risk coefficient, determining whether the particular event chain represents a risky user behavior.

2. The computer-implemented method of claim 1, wherein identifying the particular event chain from the behavior data comprises:
identifying a time period;
based on behavior data corresponding to the time period, determining events occurred during the time period; and
determining the particular event chain by sorting the determined events in a chronological order.

3. The computer-implemented method of claim 1, wherein determining the short-term risk coefficient comprises:
determining a short-term time period associated with the short-term risk coefficient;
determining a total number of event chains the user performed in the short-term time period;
determining a number of times the user performed the particular event chain in the short-term time period; and
determining the short-term risk coefficient based on the total number of event chains and the number of times the user performed the particular event chain.

4. The computer-implemented method of claim 1, wherein determining the long-term risk coefficient comprises:
determining a long-term time period associated with the long-term risk coefficient;
determining a time length that the user performed the particular event chain during the long-term time period; and
determining the long-term risk coefficient based on the long-term time period and the time length for performing the particular event chain.

5. The computer-implemented method of claim 1, wherein determining the group risk coefficient comprises:
determining a total number of users in a user group associated with the user;
determining a group time period associated with the group risk coefficient;
determining a number of users in the user group that performed the particular event chain in the group time period; and determining the group risk coefficient based on the total number of users in the user group and the number of users that performed the particular event chain.

6. The computer-implemented method of claim 1, wherein determining whether the particular event chain represents a risky user behavior comprises determining whether the overall risk coefficient is higher than a threshold.

7. A non-transitory, computer-readable medium storing one or more instructions executable by a computer system to perform operations comprising:
  determining behavior data of a user, wherein the behavior data describes user activities of the user using a computer network;
  identifying a particular event chain from the behavior data, wherein the particular event chain includes one or more events of the user activities;
  determining an overall risk coefficient of the particular event chain, comprising:
    determining a short-term risk coefficient, a long-term risk coefficient, and a group risk coefficient;
    calculating the overall risk coefficient as an output of a mathematical function which takes the short-term risk coefficient, the long-term risk coefficient, and the group risk coefficient as inputs, wherein the mathematical function is:

$$r=w_1*a*w_2*b*w_3*c \text{ or } r=w_1*a+w_2*b+w_3*c,$$

wherein r is the overall coefficient, a is the short-term risk coefficient, b is the long-term risk coefficient, c is the group risk coefficient, and wherein $w_1$, $w_2$ and $w_3$ can be weighting factors for individual risk coefficients; and
  based on the overall risk coefficient, determining whether the particular event chain represents a risky user behavior.

8. The non-transitory, computer-readable medium of claim 7, wherein identifying the particular event chain from the behavior data comprises:
  identifying a time period;
  based on behavior data corresponding to the time period, determining events occurred during the time period; and
  determining the particular event chain by sorting the determined events in a chronological order.

9. The non-transitory, computer-readable medium of claim 7, wherein determining the short-term risk coefficient comprises:
  determining a short-term time period associated with the short-term risk coefficient;
  determining a total number of event chains the user performed in the short-term time period;
  determining a number of times the user performed the particular event chain in the short-term time period; and
  determining the short-term risk coefficient based on the total number of event chains and the number of times the user performed the particular event chain.

10. The non-transitory, computer-readable medium of claim 7, wherein determining the long-term risk coefficient comprises:
  determining a long-term time period associated with the long-term risk coefficient;
  determining a time length that the user performed the particular event chain during the long-term time period; and
  determining the long-term risk coefficient based on the long-term time period and the time length for performing the particular event chain.

11. The non-transitory, computer-readable medium of claim 7, wherein determining the group risk coefficient comprises:
  determining a total number of users in a user group associated with the user;
  determining a group time period associated with the group risk coefficient;
  determining a number of users in the user group that performed the particular event chain in the group time period; and
  determining the group risk coefficient based on the total number of users in the user group and the number of users that performed the particular event chain.

12. The non-transitory, computer-readable medium of claim 7, wherein determining whether the particular event chain represents a risky user behavior comprises determining whether the overall risk coefficient is higher than a threshold.

13. A computer-implemented system, comprising:
  one or more computers; and
  one or more computer memory devices interoperability coupled with the one or more computers and having tangible, non-transitory, machine-readable media storing instructions that, when executed by the one or more computers, perform operations comprising:
    determining behavior data of a user, wherein the behavior data describes user activities of the user using a computer network;
    identifying a particular event chain from the behavior data, wherein the particular event chain includes one or more events of the user activities;
    determining an overall risk coefficient of the particular event chain, comprising:
      determining a short-term risk coefficient, a long-term risk coefficient, and a group risk coefficient;
      calculating the overall risk coefficient as an output of a mathematical function which takes the short-term risk coefficient, the long-term risk coefficient, and the group risk coefficient as inputs, wherein the mathematical function is:

$$r=w_1*a*w_2*b*w_3*c \text{ or } r=w_1*a+w_2*b+w_3*c,$$

wherein r is the overall coefficient, a is the short-term risk coefficient, b is the long-term risk coefficient, c is the group risk coefficient, and wherein $w_1$, $w_2$ and $w_3$ can be weighting factors for individual risk coefficients; and
      based on the overall risk coefficient, determining whether the particular event chain represents a risky user behavior.

14. The computer-implemented system of claim 13, wherein identifying the particular event chain from the behavior data comprises:
  identifying a time period;
  based on behavior data corresponding to the time period, determining events occurred during the time period; and
  determining the particular event chain by sorting the determined events in a chronological order.

15. The computer-implemented system of claim 13, wherein determining the short-term risk coefficient comprises:
  determining a short-term time period associated with the short-term risk coefficient;

determining a total number of event chains the user performed in the short-term time period;

determining a number of times the user performed the particular event chain in the short-term time period; and determining the short-term risk coefficient based on the total number of event chains and the number of times the user performed the particular event chain.

16. The computer-implemented system of claim 13, wherein determining the long-term risk coefficient comprises:

determining a long-term time period associated with the long-term risk coefficient;

determining a time length that the user performed the particular event chain during the long-term time period; and determining the long-term risk coefficient based on the long-term time period and the time length for performing the particular event chain.

17. The computer-implemented system of claim 13, wherein determining the group risk coefficient comprises:

determining a total number of users in a user group associated with the user;

determining a group time period associated with the group risk coefficient;

determining a number of users in the user group that performed the particular event chain in the group time period; and determining the group risk coefficient based on the total number of users in the user group and the number of users that performed the particular event chain.

* * * * *